United States Patent Office 3,013,092
Patented Dec. 12, 1961

3,013,092
CHEMICAL SEPARATION AND PURIFICATION
OF DIARYLBUTANES
Lloyd M. Watson and Edwin A. Allgeier, Cincinnati, Ohio, assignors to National Distillers and Chemical Corporation, New York, N.Y., a corporation of Virginia
No Drawing. Filed Dec. 18, 1959, Ser. No. 860,350
12 Claims. (Cl. 260—674)

The present invention relates to a process for the production of pure diarylbutanes and, more particularly, to a process for producing pure normally solid diarylbutanes by hydrolysis of the corresponding dialkali metal diarylbutanes.

It is an object of this invention to provide a novel, economical, and practical method for the production of pure normally solid diarylbutanes. It is a further object to obtain pure 1,4-diphenylbutane by hydrolyzing 1,4-dialkali metal diphenylbutane, separating 1,4-diphenylbutane from the resulting mixture, and purifying the 1,4-diphenylbutane. Additional objectives of the invention will become apparent from the detailed description set forth below.

Diarylbutanes may be obtained by processes such as are described in copending application Serial No. 702,765 (filed December 16, 1957, now U.S. Patent No. 2,956,086, issued October 11, 1960) and in U.S. Patent No. 2,816,913. In one possible process, for example, a vinyl aromatic compound such as styrene is selectively dimerized in the presence of a finely dispersed alkali metal in a suitable liquid medium, and, if desired, in the presence of a relatively small amount of a polycyclic aromatic hydrocarbon. The alkali metal dimers thus obtained are contacted with a hydrolyzing reagent having at least one active hydrogen and being capable of reacting with the dialkali metal compounds to remove the alkali metal therefrom, whereby the corresponding diphenylbutane results.

As has been disclosed, e.g., in U.S. Patent No. 2,816,913, vinyl aromatic compounds which are useful for the selective dimerization process include styrene and ring-substituted styrenes such as, for example, the ortho, meta, and para methyl styrenes; the ethyl styrenes; and the like. Sodium, potassium, or lithium, but preferably finely dispersed sodium, may be used as the alkali metal reactant. The most suitable dimerization reaction medium consists essentially of an ether, the simple methyl monoethers, such as dimethyl ether, and the polyethers of ethylene glycols, such as ethylene glycol dimethyl ether, being preferred. The dimerization reaction mixture may also include a relatively small amount of at least one compound of the polycyclic aromatic class, that is, condensed ring hydrocarbons such as naphthalene and phenanthrene; uncondensed polycyclic compounds such as diphenyl, the terphenyls, dinaphthyl, tetraphenyl ethylene, and the like, or mixtures of these compounds. The compounds such as diphenyl, the terphenyls, and mixtures thereof have been found to be particularly useful.

In this process of preparing diarylbutanes, the dimerization step must be carried out at a temperature preferably below about 0° C.; the temperature range of about −20° to −75° C. is preferred. In general, the styrenes undergo extensive polymerization at temperatures above 0° C., resulting in the formation of large quantities of polystyrenes instead of the desired disodium dimers. Also it has been found advantageous to carry out the dimerization of the olefin in the presence of at least one solid friable attrition agent, as is described in U.S. Patent No. 2,816,913.

The hydrolyzing reagent for the dialkali metal dimers is preferably one having at least one active hydrogen and being capable of reacting with the dialkali metal compounds to remove the dialkali metal therefrom. Typical hydrolyzing reagents are water; alcohols, such as methanol, ethanol, and tertiary butyl alcohol; glycols; acetylene; aniline; dialkyl ketones; alkyl aryl ketones; and acids, both organic and inorganic, such as hydrogen chloride, hydrogen bromide, sulfuric acid, nitric acid, acetic acid, benzoic acid, and the like; or mixtures of these.

Although the process of the present invention will be described primarily in relation to the isolation and purification of 1,4-diphenylbutane, it is not intended that the process be limited thereto since it is equally applicable to the isolation and purification of other normally solid diarylbutanes prepared by other methods than those specifically disclosed and described herein. Other normally solid diarylbutanes include, for example, 2,3-diphenylbutane, 1-(chlorophenyl)-4-phenylbutane, dinaphthylbutane, and 1,4-di-(9-phenanthryl)butane.

When the starting materials for the dimerization reaction are styrene and sodium, the product is 1,4-disodiodiphenylbutane, which upon hydrolysis yields 1,4-diphenylbutane. This 1,4-diphenylbutane is contaminated with, for example, hydrocarbon polymers and polystyrene. In addition to impurities such as these, diarylbutanes made by other methods may contain additional contaminants, such, as for example, unreacted raw materials. It is an object of the present invention to isolate the product from such contaminants and to purify it. Previous attempts to purify this material simply and efficiently have not been successful.

It has now been found that 1,4-diphenylbutane may be isolated from the mixture containing it and contaminants by means of fractional crystallization. If desired, it may further be purified by treatment with an alcohol and a decolorizing agent, such as activated carbon, or otherwise treated to remove trace amounts of impurities which impart color to the product.

In a specific embodiment of this invention, a mixture obtained from the hydrolysis of 1,4-disodiodiphenylbutane and containing 1,4-diphenylbutane, 1,3-diphenylbutane, solvent, and contaminants is first partially stripped of the solvent, e.g., by distillation at atmospheric pressure. The temperature of the solution containing the crude 1,4-diphenylbutane is then lowered to about +10° to −30° C., and preferably to about −10° to −30° C., whereupon the crude 1,4-diphenylbutane crystallizes out. The material is filtered, and the crude 1,4-diphenylbutane is then recrystallized from an aliphatic hydrocarbon to remove most of the impurities. Any remaining impurities, such as higher hydrocarbons or low molecular weight polystyrene, are then removed by refluxing the purified 1,4-diphenylbutane with an alcohol and a decolorizing agent, such as activated carbon; filtering hot, e.g., at about 55° to 65° C.; and cooling to about 0° to 25° C. or by adding cold water to precipitate pure 1,4-diphenylbutane.

1,4-diphenylbutane may be purified by recrystallizing it from any suitable aliphatic hydrocarbon, such as petroleum ether, alkylate, pentane, hexanes, heptanes, octanes, nonanes, and the like, and mixtures thereof. The amount of hydrocarbon solvent employed may range from about 2 to about 5 parts by weight of solvent per part of diphenylbutane, although this proportion is not unduly critical.

The aliphatic hydrocarbon retained from the recrystallization step may then be removed, for example, by distillation, and an oil layer containing 1,4-diphenylbutane and 1,3-diphenylbutane recovered. This oil layer is permitted to stand, whereupon 1,4-diphenybutane precipitates out, leaving an oil comprising essentially 1,3-diphenylbutane.

If desired, the 1,4-diphenylbutane may be further purified, e.g., to remove traces of decolorizing substances, by refluxing it in alcohol, e.g., an aliphatic alcohol having the general formula $C_nH_{2n+2}O$, where $n=1$ to 8, and isomers thereof, such as methanol, ethanol, or propanol, containing about 1 to 2 percent, and preferably about 1.5 percent, of an activated carbon, based on the weight of the crude diphenylbutane.

The invention will be described in greater detail by the following examples. These examples and embodiments are illustrative only and the invention is not intended to be limited thereto in any way except as indicated by the appended claims. All parts are expressed by weight unless otherwise specified.

*Example 1*

360 parts of ethylene glycol diethyl ether and 2 parts of o-terphenyl were charged to a stirred reactor in which a nitrogen atmosphere was maintained. A dispersion consisting of 12.2 parts of metallic sodium in about 50 parts of n-butyl ether was added to the reactor. The mixture was cooled to about −60° C. A mixture of 26 parts of styrene and 180 parts of ethylene glycol diethyl ether was added slowly to the reactor over a period of 4 hours. During this period rapid agitation of the reacting mixture was maintained. After the completion of the sodium addition, the resulting disodium derivative was treated with excess water to form 1,4-diphenylbutane; the organic solvent layer and the water layer were separated; and the water layer was discarded. About 70–80 percent of the solvent was then stripped from the organic layer by distillation at atmospheric pressure. The concentrated organic layer was then cooled to −30° C., whereupon the crude 1,4-diphenylbutane crystallized out. It was immediately filtered and recovered. The crude 1,4-diphenylbutane was then recrystallized from petroleum ether (B.P. 30–60° C.), and the resulting purified 1,4-diphenylbutane was refluxed for 1 hour with 3 parts of methanol containing 0.001 parts of activated carbon. The solution was filtered at about 60° C. to remove the carbon; the filtrate was cooled to about 10° C to precipitate pure 1,4-diphenylbutane and then filtered. The product, pure 1,4-diphenylbutane (M.P. 51° C.), was then dried in a vacuum oven for 6 hours.

The petroleum ether retained from the first recrystallization was stripped, and an oil layer containing 1,3- and 1,4-diphenylbutane was recovered. Upon standing, 1,4-diphenylbutane precipitated out of the oil layer. By infrared analysis the remaining oil layer was determined to be 1,3-diphenylbutane.

*Example 2*

Dimethyl ether (400 parts) and naphthalene (one part) were charged to a stirred reactor in which an atmosphere of nitrogen was maintained. A dispersion consisting of 25 parts of metallic sodium in about 74 parts of alkylate (mineral spirits, B.P. 171° to 207° C.) and one part of aluminum stearate was added to the reactor. The mixture was cooled to about −20° C. Approximately 53.2 parts of styrene combined with 200 parts of alkylate was added slowly to the reactor over a period of three hours. Agitation was maintained during this time and for an additional 20 minutes after the styrene-alkylate mixture had been added. The resulting disodium derivative was then treated slowly with 150 parts of water in a nitrogen atmosphere to form 1,4-diphenylbutane. The organic layer was separated from the water layer, and the latter was discarded. About 60–70 percent of the solvent was then distilled from the organic layer at atmospheric pressure. The organic layer was then cooled to −10° C., and crude 1,4-diphenylbutane which crystallized out was immediately filtered and recovered. The crude 1,4-diphenylbutane was then recrystallized from petroleum ether. The resulting purified 1,4-diphenylbutane was refluxed for 30 minutes with 3 parts of ethanol containing 0.002 parts of activated carbon. The solution was filtered at about 65°–70° C. to remove the carbon. The filtrate was cooled to about 0° to +5° C. to precipitate pure 1,4-diphenylbutane and then filtered. The product, pure 1,4-diphenylbutane (M.P. 51° C.), was then dried in a vacuum oven for 6 hours.

The petroleum ether retained from the first recrystallization was distilled at atmospheric pressure, and an oil layer containing 1,3- and 1,4-diphenylbutane was recovered. Upon standing for 24 hours, 1,4-diphenylbutane precipitated out of the oil layer. Infrared analysis showed the remaining oil layer to be 1,3-diphenylbutane.

*Example 3*

380 parts of dimethyl ether and 2 parts of o-terphenyl were introduced into a stirred reactor in which a nitrogen atmosphere was maintained. A dispersion of 27 parts of metallic sodium in about 72 parts of isooctane was added to the reactor. The mixture was cooled to +30° C. A mixture of 39 parts of styrene and 210 parts of isooctane was added slowly to the reactor over a period of about 5 hours. During this period rapid agitation of the reacting mixture was maintained. When the sodium addition was completed, the resulting disodium derivative was treated with an excess of methanol to form 1,4-diphenylbutane. About 80 percent of the solvent was then distilled off at atmospheric pressure, the concentrated organic layer was then cooled to +25° C., and the crude 1,4-diphenylbutane crystallized out. The crude 1,4-diphenylbutane was then recrystallized from hexane. The resulting purified 1,4-diphenylbutane was refluxed for 30 minutes with 5 parts of isopropanol containing 0.005 part of activated carbon. The solution was filtered at about 60° C. to remove the carbon. The filtrate was cooled to about 0° C. to precipitate pure 1,4-diphenylbutane and then filtered. The pure 1,4-diphenylbutane (M.P. 51° C.) was dried for 12 hours in a vacuum oven.

The hexane retained from the first recrystallization was distilled, and an oil layer containing 1,3- and 1,4-diphenylbutane was recovered. Upon standing, 1,4-diphenylbutane precipitated out of the oil layer. Infrared analysis showed the remaining oil layer to be 1,3-diphenylbutane.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for the preparation of a normally solid diarylbutane in which the product is present in solution in a hydrocarbon, the steps of separating and purifying the diarylbutane which comprise (1) reducing the temperature of the hydrocarbon solution to about 10° to −30° C. to precipitate crude diarylbutane out of said solution and (2) recrystallizing said diarylbutane from an aliphatic hydrocarbon.

2. The process of claim 1 wherein the aliphatic hydrocarbon is petroleum ether.

3. The process of claim 1 wherein the aliphatic hydrocarbon is hexane.

4. The process of claim 1 wherein the temperature is reduced to about −10° to −30° C.

5. The process of claim 1 wherein the purified diarylbutane is further purified by refluxing it with an alcohol and about 1 to 2 percent of activated carbon, based on the weight of the crude diarylbutane; removing the activated carbon; reducing the temperature of the filtrate to about 0° to 25° C. to precipitate pure diarylbutane; and separating the product.

6. In a process for the preparation of a normally solid diphenylbutane in which the product is present in solution in a hydrocarbon, the steps of separating and purifying the diphenylbutane which comprise (1) reducing the temperature of the hydrocarbon solution to about 10° to −30° C. to precipitate crude diphenylbutane out of said solution and (2) recrystallizing said diphenylbutane from an aliphatic hydrocarbon.

7. The process of claim 6 wherein the purified diphenylbutane is further purified by refluxing it with an alcohol and about 1 to 2 percent of activated carbon, based on the weight of the crude diphenylbutane; removing said activated carbon; reducing the temperature of the filtrate to about 0° to 25° C. to precipitate pure diphenylbutane; and separating the product.

8. In a process for the preparation of 1,4-diphenylbutane in which the product is present in solution in a hydrocarbon, the steps of separating and purifying the 1,4-diphenylbutane which comprise (1) reducing the temperature of the hydrocarbon solution to about 10° to −30° C. to precipitate crude 1,4-diphenylbutane out of said solution and (2) recrystallizing said 1,4-diphenylbutane from an aliphatic hydrocarbon.

9. The process of claim 8 wherein the purified 1,4-diphenylbutane is further purified by refluxing it with an alcohol and about 1 to 2 percent of activated carbon, based on the weight of the crude 1,4-diphenylbutane; removing said activated carbon; reducing the temperature of the filtrate to about 0° to 25° C. to precipitate pure 1,4-diphenylbutane; and separating the product.

10. In a process for the preparation of 1,4-diphenylbutane in which the product is present in solution in a hydrocarbon, the steps of separating and purifying the 1,4-diphenylbutane which comprise (1) reducing the temperature of the hydrocarbon solution to about −10° to −30° C. to precipitate crude 1,4-diphenylbutane out of said solution, (2) recrystallizing said 1,4-diphenylbutane from petroleum ether, (3) refluxing the purified 1,4-diphenylbutane with methanol and about 1.5 percent of activated carbon, based on the weight of the crude 1,4-diphenylbutane, (4) removing the activated carbon by filtering, (5) reducing the temperature of the filtrate to about 10° C. to precipitate pure 1,4-diphenylbutane, and (6) separating the 1,4-diphenylbutane from the system.

11. In a process for the preparation of pure 1,4-diphenylbutane and of pure 1,3-diphenylbutane in which the products are present in solution in a hydrocarbon, the steps of separating the 1,4-diphenylbutane and the 1,3-diphenylbutane from the solution and from each other which comprise (1) reducing the temperature of the hydrocarbon solution to about 10° to −30° C. to precipitate crude 1,4-diphenylbutane out of said solution, (2) recrystallizing said 1,4-diphenylbutane from an aliphatic hydrocarbon, (3) refluxing the purified 1,4-diphenylbutane with an alcohol and about 1 to 2 percent of activated carbon, based on the weight of the crude 1,4-diphenylbutane, (4) removing said activated carbon, (5) reducing the temperature of the filtrate to about 0° to 25° C. to precipitate pure 1,4-diphenylbutane, (6) separating the 1,4-diphenylbutane from the system, (7) distilling the aliphatic hydrocarbon from step (2), and (8) permitting the distillate from step (7), which comprises 1,4-diphenylbutane and 1,3-diphenylbutane, to stand, whereby 1,4-diphenylbutane precipitates out, leaving 1,3-diphenylbutane.

12. The process as described in claim 11 wherein the temperature of step (1) is about −10° to −30° C., the aliphatic hydrocarbon of step (2) is hexane, the alcohol of step (3) is isopropanol used with 1.5 percent of activated carbon, the activated carbon of step (4) is removed by filtering, and the temperature of step (5) is about 10° C.

References Cited in the file of this patent
UNITED STATES PATENTS

| | | |
|---|---|---|
| 2,518,236 | Hirschler | Aug. 8, 1950 |
| 2,766,310 | Bennett et al. | Oct. 9, 1956 |
| 2,776,328 | Bennett et al. | Jan. 1, 1957 |